US005993035A

United States Patent [19]

May et al.

[11] Patent Number: 5,993,035

[45] Date of Patent: Nov. 30, 1999

[54] COMBINED LIGHT SHIELD AND HEAT SHIELD FOR HEADLIGHT

[75] Inventors: Martin R. May, North Royalton; Todd H. Christian, Wadsworth; Jeffrey L. Thompson, Hudson; Thomas J. Franz, North Canton, all of Ohio

[73] Assignee: Trans Technology Engineered Components, LLC, Brunswick, Ohio

[21] Appl. No.: 09/037,204

[22] Filed: Mar. 9, 1998

[51] Int. Cl.[6] .............................. B60Q 1/04; F21V 29/00

[52] U.S. Cl. .......................... 362/547; 362/294; 362/373; 362/351

[58] Field of Search .................................... 362/547, 539, 362/351, 294, 373

[56] References Cited

U.S. PATENT DOCUMENTS

| | | | |
|---|---|---|---|
| 4,029,985 | 6/1977 | Rachel | 313/115 |
| 4,380,794 | 4/1983 | Lawson | 362/294 |
| 4,642,514 | 2/1987 | English et al. | 313/111 |
| 4,679,127 | 7/1987 | Ernst et al. | 362/294 |
| 4,740,875 | 4/1988 | Wyckoff et al. | 362/336 |
| 4,754,373 | 6/1988 | Otto et al. | 362/294 |
| 4,814,959 | 3/1989 | Chakrabarti et al. | 362/61 |
| 4,931,912 | 6/1990 | Kawakami et al. | 362/294 |
| 5,204,578 | 4/1993 | Dever et al. | 313/28 |
| 5,465,195 | 11/1995 | Jenner et al. | 362/294 |

*Primary Examiner*—Thomas M. Sember
*Attorney, Agent, or Firm*—Albert E. Chrow; Daniel S. Kalka

[57] ABSTRACT

In one embodiment (100), a combination is provided comprising a light shield (6) having a hollow cup-like configuration having an open-end (8) and a closed end (10) having a hollow open-end heat shield (12) nested or positioned therewithin and separated therefrom by an open air gap disposed thereabout such that light rays emitted from a heat and light emitting source (32) are able to pass through heat shield (12) and impact and upon closed end (10) of light shield (6) to reduce glare to a viewer while being cooled by the heat sink provided by heat shield (12).

In another embodiment (200), a hollow heat shield (26) having an open-end (28) and a closed end (30) is supported within light shield (6) such that the light rays from the heat and light emitting source (32) impact upon closed end (30) of heat shield (26) rather than closed end (10) of light shield (6).

14 Claims, 2 Drawing Sheets

COMBINED LIGHT SHIELD AND HEAT SHIELD FOR HEADLIGHT

CROSS-REFERENCE TO RELATED APPLICATIONS

Not Applicable

STATE REGARDING FEDERALLY SPONSORED RESEARCH OR DEVELOPMENT

Not Applicable

MICROFICHE APPENDIX

Not Applicable

INTRODUCTION

This invention relates generally to a combination of light shield and a heat shield for a vehicular headlight for which the light shield is operative to reduce glare and the heat shield is operative to reduce the light shield's exposure to heat by absorbing heat emitted from the headlight's light source and more particularly to such combination wherein the light shield has a hollow cup-like configuration and the heat shield is positioned within the light shield with an open air gap therebetween for additional thermal protection and has a hollow configuration having at least one open end for receiving at least a portion of the light and heat emitting source thereinto.

BACKGROUND OF THE INVENTION

Many of today's vehicular headlights have for some time included either or both a light shield or a heat shield with the former operative to reduce glare when facing theretoward and the latter operative to absorb heat being emitted from the light source that characteristically extends, at least in part, into the cavity within the headlight frame such as in the case of sealed beam construction and more commonly in connection with the low beam member of a sealed beam construction well known to those skilled in the art of vehicular headlights.

Vehicular headlights have heretofore been manufactured in large part from plastic and vacuum metalized plastic materials well known to those skilled in the art. Lately it has been the practice to provide vehicular headlights with a clear lens primarily for styling purposes but which characteristically increases the degree of glare to which a viewer is exposed and which has been reduced by incorporating a light shield operative to shield the light source from a viewer in front of the headlight looking heretoward and to assist in the photomatic properties of casting light from the light source onto the headlight reflector such that the viewer is exposed primarily to reflected light having reduced glare.

Because of the close proximity of the light shield to the light source, they have heretofore been characteristically manufactured from metal so as to withstand heat radiated from the light source.

Prior art heat shields have heretofore been located outside of the light shield and most commonly have been positioned above the light source due to the tendency for heat to rise upwardly within the headlight interior.

Prior art practices for minimizing glare when facing directly towards a lighted vehicular headlight are disclosed for example in U.S. Pat. No. 4,679,127 in which the end of the light source (filament bulb) is contacted with an opaque light absorbing material and in U.S. Pat. No. 4,740,875 in which the inside of the lens is configured to reduce glare in addition to the end of the light source being coated with an opaque light absorbing material, the disclosures of both of which are incorporated herein by reference.

An example of an automotive headlamp having a glare shield disposed about the light source is disclosed in U.S. Pat. No. 4,754,373 and a example of a rectangular headlight having a light shield disposed outwardly of the end of a light emitting filament is disclosed in U.S. Pat. No. 4,029,985, the disclosures of both of which are incorporated herein by reference.

Examples of automotive headlamps that employ both a light and a heat shield can be found in U.S. Pat. Nos. 4,642,514 and 5,204,578, the disclosures of both which are incorporated herein by reference. None, however, provide a combination wherein a heat shield is positioned within a light shield as is the case in the present invention for in both U.S. Pat. Nos. 4,642,514 and 5,204,578, the heat shield is provided as a separate member positioned below the light filament and, in U.S. Pat. No. 4,642,514 the combination of a heat shield and a light shield is provided in the form of layers in the inside of the headlamp lens.

In contrast to the prior art, the present invention provides the combination of a light shield and a heat shield in which the heat shield is positioned within the light shield in spaced-apart relationship thereto with the combination being easily secured about the light source within the headlight without the cost of complexity of having to apply layers to the inside of the headlamp lens or having to secure the heat shield and the light shield separately to the headlight as well as eliminating the need to manufacture the light shield exclusively from metal where such is desired since the heat shield is disposed intermediate the light source and the light shield with the added thermal protection provided by an open air gap therebetween.

BRIEF SUMMARY OF THE INVENTION

Accordingly, it is an object of the invention to provide a combined light shield and heat shield for a vehicular headlight.

It is another object of this invention to provide a combined light shield and heat, shield for a vehicular headlight that is easily secured in position about the light emitting source.

It is yet another object of this invention to provide a combination of a light shield and heat shield that is highly efficient due at least in part of the heat shield being disposed within the light shield in spaced-apart relationship thereto thereby shielding the light shield from heat radiated by the light emitting source in addition to having an open air gap therebetween operative to further insulate the light shield from heat.

DETAILED DESCRIPTION OF THE INVENTION

Figure 1:
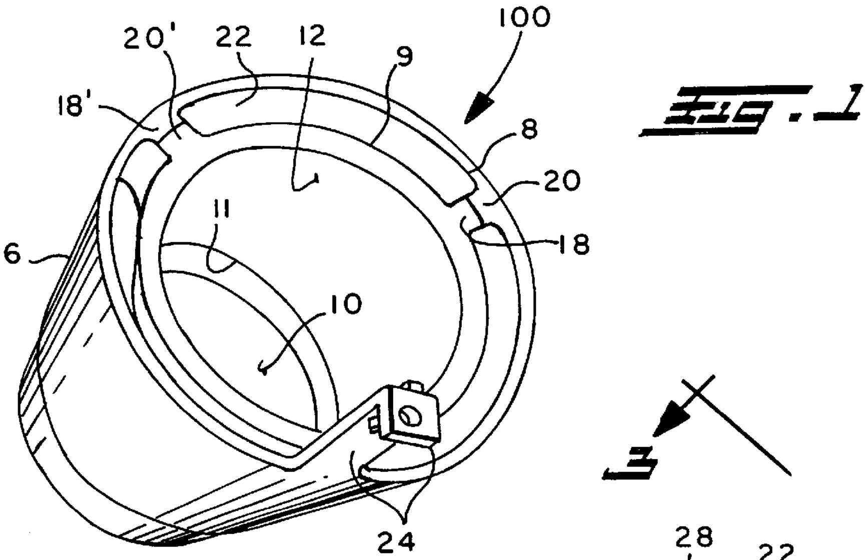
FIG. 1 is a perspective view of an embodiment of the combined light and heat shield of the invention referenced by numeral 100.
Figure 5:
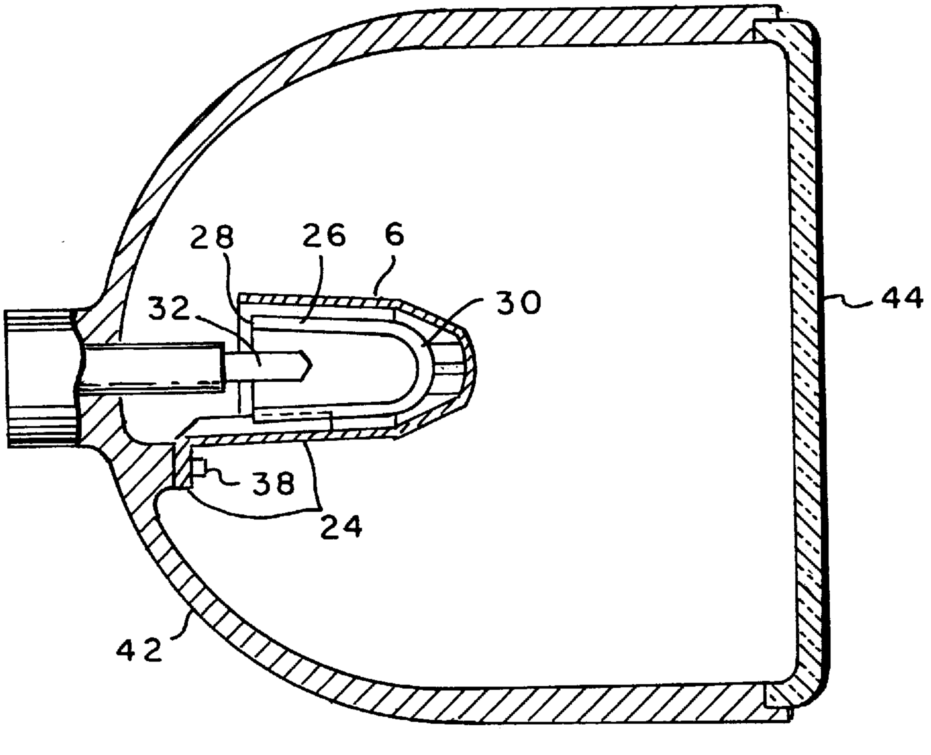
FIG. 5 is a central cross-sectional view of a vehicular headlight having combined light and heat shield 200 secured thereto.

In FIG. 1, combined light and heat shield 100 comprises a light shield 6 having a hollow cup-like configuration having an open end 8 and a closed end 10 within which is secured a hollow heat shield (or sink) 12 that is open at opposite ends 9 and 11 and is operative to receive at least a portion of the headlamp's light source through open-end 9 as shown in FIG. 5.

Although heat shield 12 is shown in the FIGS. as being uniform in axial dimension about its circumference, it may have a longer axial length at the upper half of its periphery so as to provide a larger heat sink mass about the upper half of the light emitting source since heat emitted by the light source will ordinarily rise upwardly.

For purposes of heat insulators, heat shield 12 is preferably supported or nested in spaced-apart relationship to light shield 6 preferably by means of a plurality of spaced-apart support members such as referenced by numerals 18 and 18' which may have corresponding counterparts 20 and 20' in registration therewith. The spaced-apart relationship between light shield 6 and heat shield 12 provides a substantially annular open-ended air gap about heat shield 12 that is operative to further insulate light shield 6 from heat.

Combined Light shield 6 and heat shield 12 is further provided with means such as support or bracket member 24 for supporting the combination in front of the headlamp light emitting source such as light emitting source 32 shown in FIG. 5 so that at least a portion of light emitting source 32 extends through the open end of the heat shield which in FIG. 5 is open end 28.

Thus for the combination of the invention referenced by numeral 100, light rays emitted by the light emitting source are able to pass entirely through heat shield 6 and be blocked by closed end 10 of light shield 6 to prevent glare while heat emitted from the light emitting source is absorbed by surrounding heat shield 12.

Figure 2:
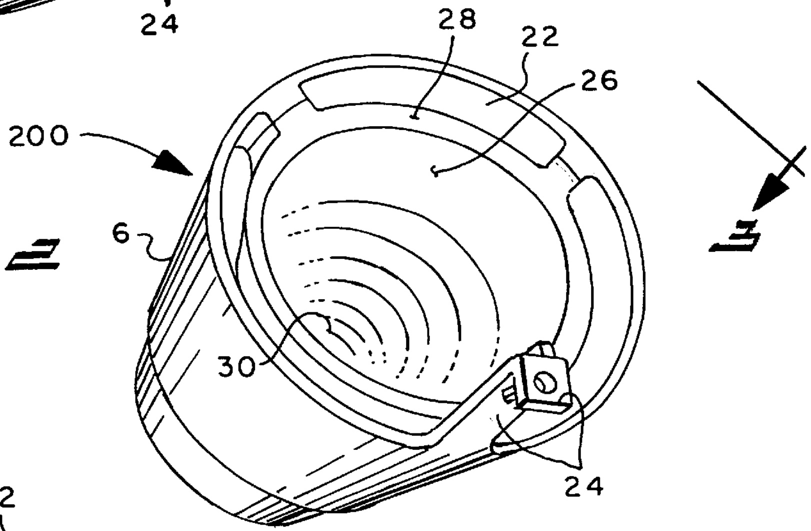
FIG. 2 is a perspective view of another embodiment of the combined light and heat shield of the invention referenced by number 200.
Figure 4:
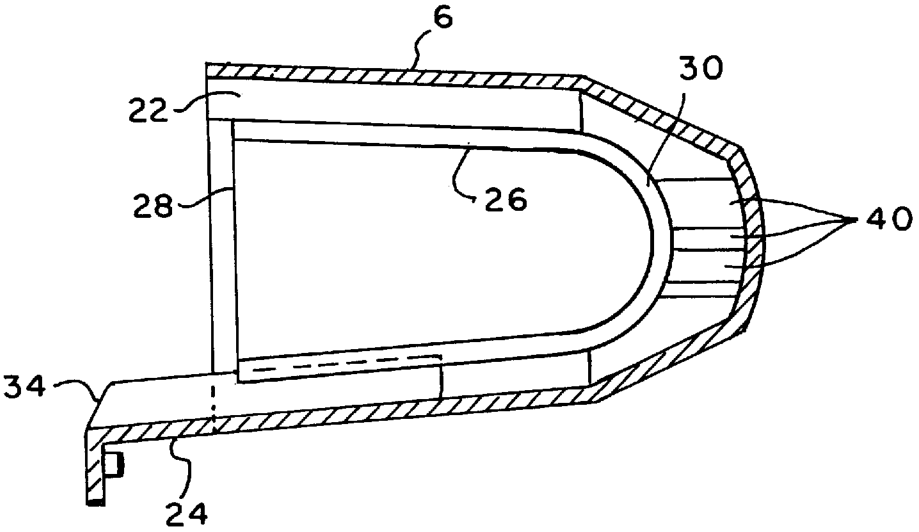
FIG. 4 is a central cross-sectional view of combined light and heat shield 200 of FIG. 2

The combination embodiment referenced by numeral 200 in FIGS. 2 and 4 features a hollow heat shield 22 supported or nested in spaced-apart relationship within hollow light shield 6 and having an open end 28 and an opposite closed end 30 such that light rays emitted from a vehicular headlight light emitting source passes through heat shield 26 and light shield 6 and impact upon closed end 30 of heat shield 26 rather than the closed end of light shield 6 disposed thereabout. Like the combination light and heat shield of FIG. 1, the embodiment referenced by numeral 200 likewise includes an open-ended air gap 22 disposed about the heat shield, i.e., between the heat and light shields.

Like combination 100, combination 200 is provided with means such as support or bracket 24 for supporting it in front of a headlamp light source such that at least a portion of the light source extends through the open end of heat shield 26 (and also light shield 6).

Figure 3:
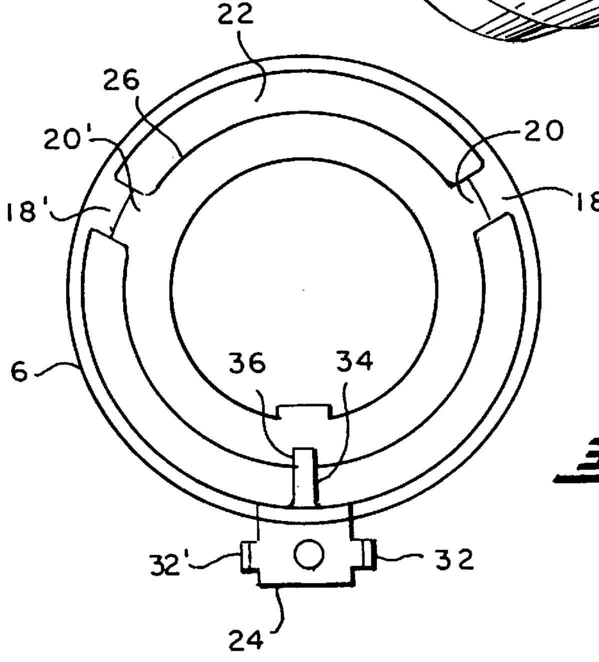
FIG. 3 is an end-view of combined light and heat shield 200 taken along view line 3—3 in FIG. 2.

FIG. 3 is an end-view of the combined heat and light shield of the invention referenced by numeral 200 in FIG. 2 that better illustrates the preferred way by which heat shield 26 is nested within light shield 6 by means of spaced-apart raised sections or pads 18 and 18' extending radially inwardly from the inner surface of light shield 6 that are preferably engaged by corresponding spaced-apart pads 20 and 20' that extend radially outwardly from the outer surface of heat shield 26 and are in registration with and engage pads 18 and 18' respectively. Although shown as being flat along their respective axial lengths pads 18, 18' and 20 and 20' may have matching tapers such that they ramp together as heat shield 26 is pressed into light shield 6 for nested spaced-apart engagement therewith.

The outer surface of heat shield 26 preferably includes an axially extending groove 36 into which is received a rib 34 that extends from bracket member 24 as shown in FIG. 3. The raised pads and the cooperation between groove 36 and rib 34 keep heat shield 6 in spaced-apart relationship to heat shield 26 to provide open-ended air gap 22 about heat shield 26 to further insulate it from light shield 6 as well as prevent heat shield 26 from rotating relative light shield 6.

Bracket 24 is preferably provided with an end pad (not referenced) through which an opening or bore 36 extends for attachment to the vehicle headlight by means of a screw or bolt or the like referenced by numeral 38 in FIG. 5.

The end pad of bracket 24 may also include at least one and preferably two tabs 32 and 32' shown in FIG. 3 that extend therefrom and are adapted to be received into corresponding slot(s) in registration therewith in the reflective wall of the vehicle headlight so as to simplify alignment of the heat and light shield combination of the invention about light emitting source 32 as shown in FIG. 5.

FIG. 4 also illustrates where heat shield 26 or light shield 6 may preferably include projections 40 extending from one to the other at the closed end of light shield 6 to ensure that a space is maintained between the closed end of light shield 6 and the open or closed end of the heat shield in facing relationship thereto. The ribs preferably comprise a plurality that are in spaced-apart relationship to each other and are preferably in transverse relationship to each other.

FIG. 5 illustrates an arrangement for mounting the combined heat and light shield of the invention within a vehicular headlamp having a reflector wall 42 commonly made from a plastic or glass material having a reflective inner surface (not referenced) and a clear plastic or glass lens such as referenced by numeral 44.

In FIG. 5, tabs 32 and/or 32' support bracket 24 are received in a slot(s) in reflector wall 42 (not referenced) and secured thereto by means of a bolt or screw 38 such that combined light and heat shield 200 is supported in front of light emitting source 32 with at least a portion of light emitting source 32 extending through opening 28 in heat shield 26 and opening 8 in light shield 6 so as to prevent glare while providing a heat sink for heat emitted by light emitting source 32 as previously described.

Although the light shield of the combination of the invention may be made from any suitable material or materials, it is preferably made from a suitable plastic or ceramic material.

The heat shield of the combination of the invention may be made from any suitable heat sink material or materials, it is preferably made from a suitable metal, plastic or ceramic material.

The inner surfaces of either or both the light shield and heat shield of the combination may be coated with suitable reflective or light absorbing materials well known to those skilled in the art.

We claim:

1. A combined light shield and heat shield for a vehicular headlight having a heat and light emitting source, said light shield comprising a cup-like configuration having a hollow interior with an open end and a closed end, said light shield having a bracket member situated at its open end constructed for securement of the light shield to the headlight, the closed end of said light shield being operative to reduce glare produced by light rays emitted therefrom, said heat shield comprising a hollow configuration made from a heat sink material and positioned within the light shield in spaced-apart relationship thereto, said heat shield being supported within said light shield by a plurality of spaced-apart support members to maintain the spaced-apart relationship and to provide a substantially annular open-ended air gap extending thereabout between the heat shield and the light shield, said substantially annular open-ended air gap being operative to insulate said light shield from heat, said heat shield having at least one open end for receiving at least a portion of the heat and light emitting source thereinto, and the combination of said light shield and heat shield being supported by said bracket member.

2. The light and heat shield combination of claim 1 wherein said plurality of spaced-apart support members comprise spaced-apart pads extending radially inwardly from an inner surface of said light shield constructed to engage corresponding spaced-apart pads extending radially outwardly from an outer surface of said heat shield, said spaced-apart pads being operative to maintain the spaced-apart relationship therebetween.

3. The combination of claim 2, wherein said spaced-apart pads on said heat and light shields comprise matching tapers.

4. The combination of claim 1 wherein the heat shield is open-ended at opposite ends enabling light rays emitted from the heat and light emiting source to pass therethrough.

5. The combination of claim 1 wherein at least an interior of a closed end of the heat shield is provided with a light reflective surface.

6. The combination of claim 1 wherein at least an interior of the closed end of the light shield is provided with a light absorbing surface.

7. The combination of claim 1 wherein the heat shield has a hollow tubular configuration.

8. The combination of claim 1, wherein said heat shield is uniform in axial dimension about its circumference.

9. The combination of claim 1, wherein said heat shield comprises an axial length longer at an upper half of its periphery than a lower half to provide a larger heat sink mass.

10. The combination of claim 1, wherein an outer surface of said heat shield further comprises an axially extending groove constructed to receive a rib extending from said bracket member.

11. The combination of claim 1, wherein said bracket member comprises an end pad with a bore extending therethrough for attachment to the vehicle headlight.

12. The combination of claim 11, wherein said end pad of said bracket member comprises at least one tab extending therefrom constructed to be received within at least one corresponding slot.

13. The combination of claim 1, wherein a closed end of said heat shield comprises at least one projection extending from an outer surface thereof to an inner surface of the closed end of said light shield for maintaining the spaced-apart relationship.

14. The combination of claim 13, wherein the inner surface of the closed end of said light shield comprises at least one projection extending therefrom to the outer surface of the closed end of said heat shield.

* * * * *